Jan. 4, 1938.  E. C. BRISBANE ET AL  2,104,151
VALVE
Filed July 25, 1936  3 Sheets-Sheet 1

INVENTORS
EUGENE C. BRISBANE AND
ROBERT BISCHOFF
BY
ATTORNEY

Jan. 4, 1938. E. C. BRISBANE ET AL 2,104,151
VALVE
Filed July 25, 1936     3 Sheets-Sheet 2

INVENTORS
EUGENE C. BRISBANE AND
ROBERT BISCHOFF
BY
*Malcolm F. Gannett*
ATTORNEY

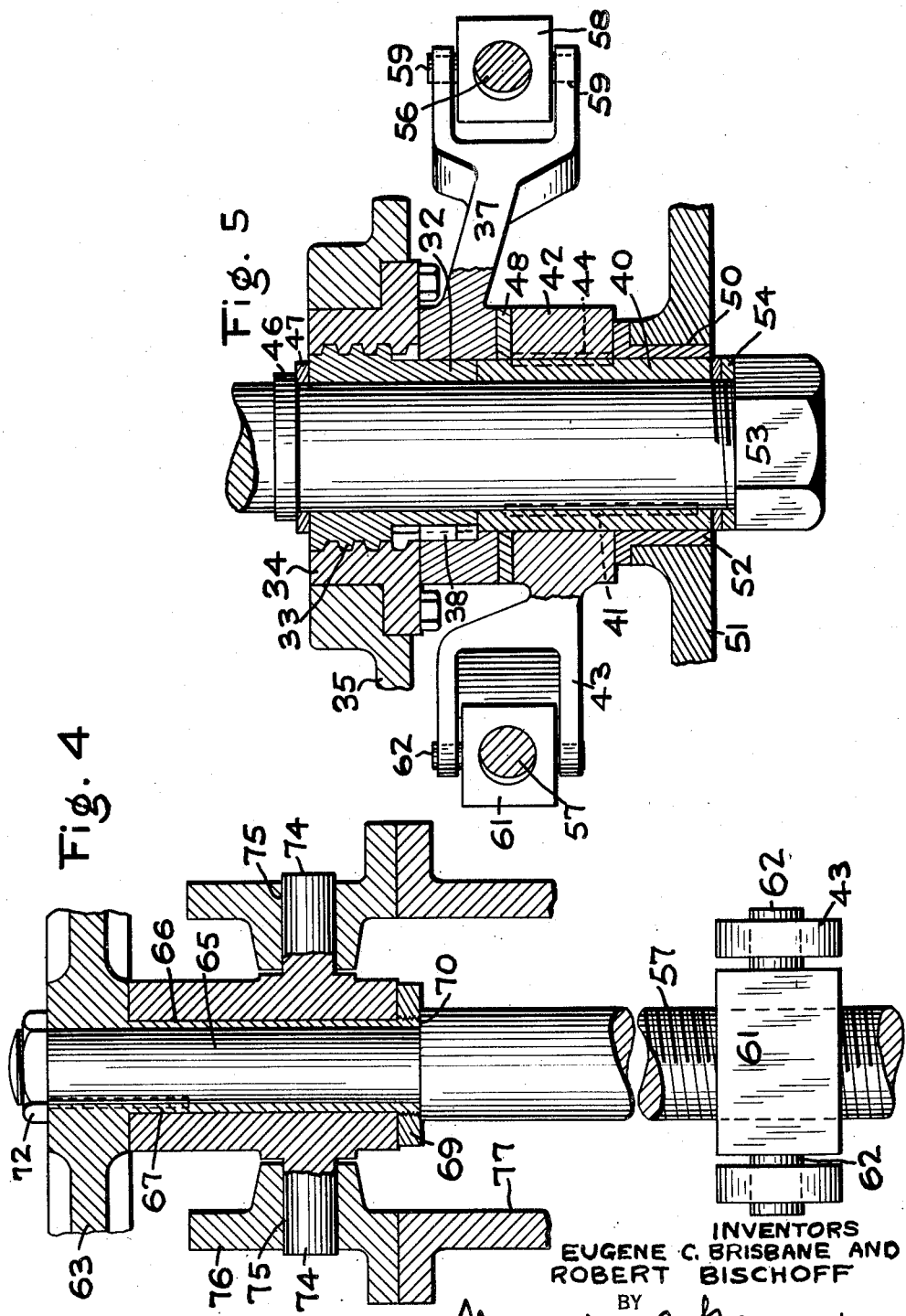

Patented Jan. 4, 1938

2,104,151

UNITED STATES PATENT OFFICE 2,104,151

VALVE

Eugene C. Brisbane and Robert Bischoff, York, Pa., assignors to S. Morgan Smith Company, York, Pa., a corporation of Pennsylvania Application July 25, 1936, Serial No. 92,556

4 Claims. (Cl. 74—89)

This invention relates to valves, and more particularly to the mechanism for opening and closing the valve.

An object of the invention is to provide an improved valve of the type having a tapered plug in which mechanism is provided for first raising the valve plug from its seat, then rotating the plug to open or to closed position, and thirdly, reseating the plug in either open or closed position.

Another object of the invention is to provide an improved valve structure which includes a rotatable plug having a shaft with a threaded sleeve loosely mounted thereon, and a plurality of levers operatively associated with the sleeve and shaft so that operation of the levers effects operation of the valve in the desired manner.

Another object of the invention is to provide an improved valve mechanism of the above type, in which the levers are operated by cross head nuts mounted on swingingly supported screw spindles.

Another object of the invention is to provide an improved valve structure of the character mentioned, which is simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawings:—

Fig. 4 is a vertical section taken on the line 4—4 of Fig. 3; and

Fig. 5 is a horizontal section taken on the line 5—5 of Fig. 2.

Figure 1:
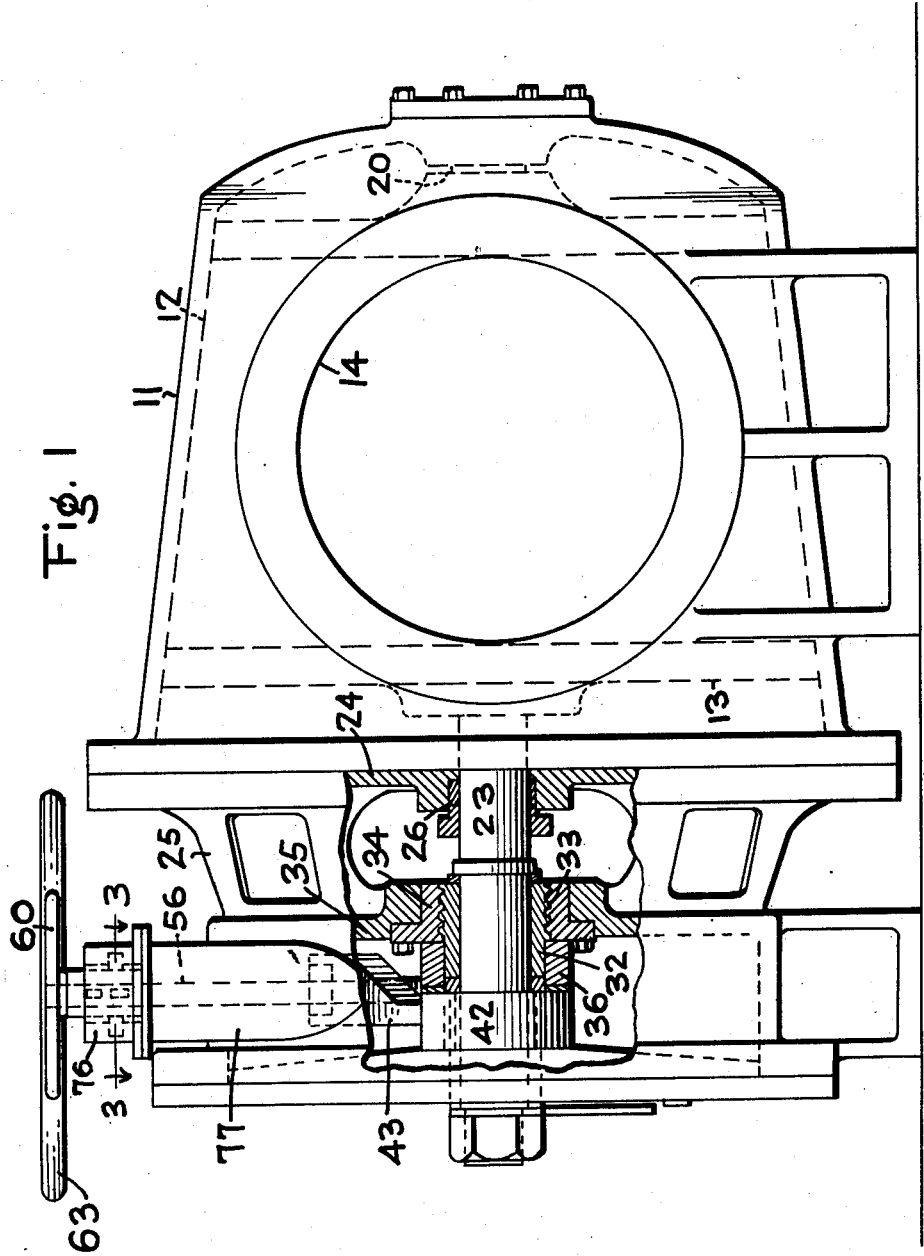
Figure 1 is a side elevation, with parts broken away and in section of a valve embodying the present invention.

The drawings illustrate a straight-way valve, but the improvements are equally applicable to three or four way, elbow and angle valves.

The present invention relates to tapered plug valves, in which, during the operation of the valve, the conical plug is first unwedged from its seat by moving the plug in a straight line axially. After the plug is unseated, it is turned the desired angle to either an open or closed position. At the completion of the rotary movement, the plug is then moved axially and wedged or reseated.

Referring to the drawings, the improved valve comprises a main body or casing 11 having a cavity 12 formed therein for a tapered plug 13, the cavity 12 being intersected by a longitudinal waterway or opening 14 which constitutes a passage through the valve.

As is customary in the construction of tapered plug valves, the plug 13 is adapted, when in either open or closed position, to be wedged or seated in the cavity 12, and therefore in order to turn the plug it is first necessary to unwedge the same. Thus, the tapered plug 13 is supported for both axial and rotary movement in the valve body 11.

At its inner or smaller end, the plug 13 is formed with an extension which constitutes a trunnion 20, and at its outer or larger end, the plug 13 has secured thereto, one end of a shaft or stem 23 which extends through a web 24 of a housing 25 attached to the valve body 11, said web constituting a cover plate for the larger end of the valve body, and said housing 25 constituting a closure for the valve operating mechanism.

A packing gland 26, fastened to the outer side of the web 24, prevents leakage of fluid around the shaft 23.

Mounted on the valve shaft 23 is a sleeve 32 having a portion of its exterior formed with screw threads 33. As shown in Fig. 5 the sleeve 32 is free to turn on the valve shaft.

The threaded portion 33 of sleeve 32 is mounted in an internally threaded bushing 34 fixed to a web 35 of the housing 25.

Mounted on the sleeve 32 is one end or hub 36 of a lever 37, said lever being connected to the sleeve 32 by means of a sliding key 38, so that when the lever 37 is operated, the sleeve 32 will also be operated. Sliding key 38 permits axial or longitudinal movement of the sleeve 32 with respect to the hub of the lever 37 in a manner to be hereinafter more fully described.

Beyond the sleeve 32 the valve shaft 23 has mounted thereon a collar 40 which is connected to said shaft by a key 41.

Mounted on the collar 40 is the hub 42 of a lever 43, said lever being keyed to the collar 40, as indicated at 44, Fig. 5. The purpose of lever 43 is to turn the valve plug 13.

At a point adjacent the inner end of sleeve 32 the shaft 23 is enlarged, as indicated at 46, and between the enlargement 46 and the inner end of sleeve 32 there is interposed a thrust washer 47.

Also interposed between the hub 36 of lever 37 and hub 42 of lever 43, is a washer 48.

Mounted in an opening 50 formed in the outer wall 51 of housing 25 is a combined washer and bushing 52 which constitutes a bearing for the outer end of valve shaft 23.

The outer end of the valve shaft 23 is threaded for the reception of a nut 53, lock washers 54 being interposed between the inner face of the nut and the outer end of bushing 52.

When the parts are being assembled, nut 53 is screwed inwardly an amount sufficient to retain sleeve 32 and collar 40 in position on the valve shaft 23, but nut 53 is not screwed in far enough to bind the sleeve 32, since the sleeve should be free to turn on the shaft 23 and should also be free to float up and down the shaft a slight distance, say .005 to .015 of an inch. When the sleeve 32 has been properly assembled on the shaft 23, the lock washers 54 will retain nut 53 in position.

The levers 37 and 43 may be moved by any form of energy, such as hydraulic, electric or manual, the construction shown in the drawings being arranged to be operated by hand.

In this construction there is provided a screw spindle 56 which is operatively connected with lever 37, and a screw spindle 57 which is operatively connected with lever 43.

The outer or free end of lever 37 is forked so as to straddle a cross head nut 58 mounted on screw spindle 56. The nut 58 carries diametrically disposed pins or trunnions 59 which are mounted in the forked end of the lever 37.

The upper end of screw spindle 56 is provided with a hand wheel 60.

The outer or free end of lever 43 is forked so as to straddle a cross head nut 61 mounted on screw spindle 57. The nut 61 carries diametrically disposed pins or trunnions 62 which are mounted in the forked end of lever 43, as shown in Fig. 4.

The upper end of screw spindle 57 is provided with a hand wheel 63.

The screw spindles 56 and 57 are both mounted so as to swing to and fro during the operation of the valve and since the manner of pivoting both spindles is the same, a description of the construction of one spindle mounting will suffice for both.

Figure 3:
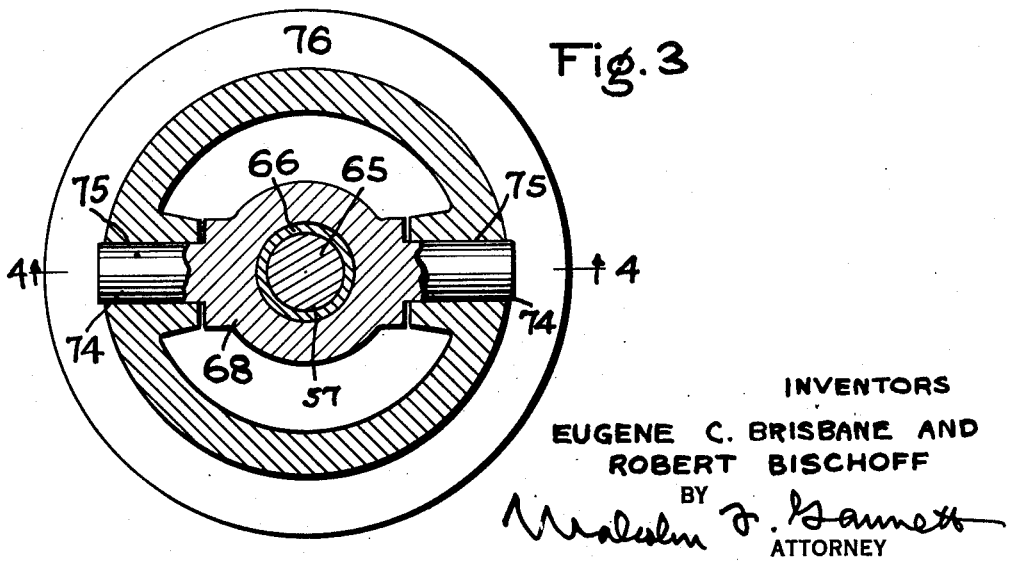
Fig. 3 is a horizontal section taken on the line 3—3 of Fig. 1.

As shown best in Figs. 3 and 4, the upper portion of screw spindle 57 is reduced somewhat in diameter, as indicated at 65.

Encircling the portion 65 of screw spindle 57 is a tubular extension 66 of the hub of hand wheel 63, said extension 66 and the hub of the hand-wheel 63 being keyed to spindle 57, as indicated at 67, Fig. 4, so that when the hand wheel is turned the screw spindle will also be turned.

Mounted on the tubular extension 66 is a sleeve 68 which extends from the hub of the hand wheel 63 downwardly to a nut 69 mounted on a threaded portion of the lower end of said tubular extension 66.

The nut 69 bears at one side against a shoulder 70 formed between the main body of the screw spindle 57 and its reduced portion 65.

The upper extremity of spindle 57 is threaded for the reception of a nut 72 which retains the hand wheel 63 in position on the spindle. Nut 72 should not be screwed down too tight so as to prevent free turning of the spindle 57 within sleeve 68.

Projecting outwardly from the sleeve 68 is a pair of diametrically disposed trunnions 74 which are journalled in openings 75 formed in a casing 76 mounted on a tubular extension 77 of housing 25. The construction is such that the screw spindle 57 and hand wheel 63 mounted thereon are free to swing about the pivot provided by the trunnions 74 when, during the operation of the device, the cross head nut 61 is moved downwardly and upwardly of the spindle to operate the lever 43.

Since lever 37 is connected to the sleeve 32, operation of lever 37 effects corresponding movement of the sleeve.

Figure 2:
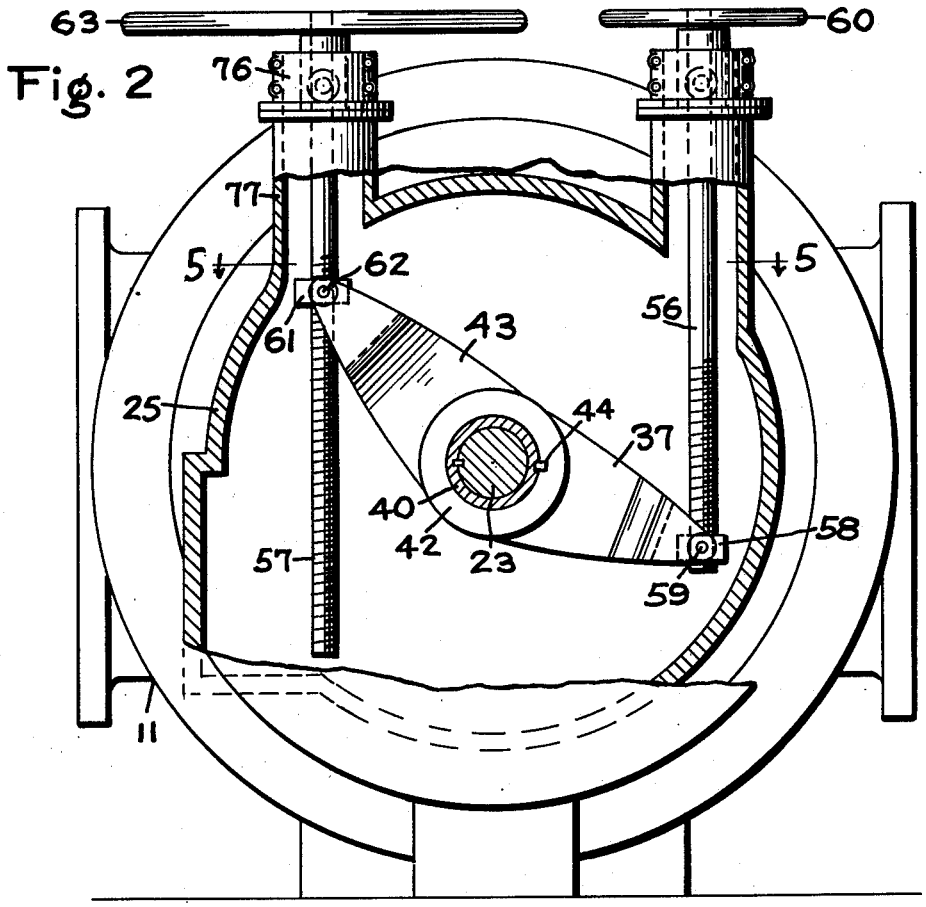
Fig. 2 is an end elevation, with parts broken away and in section of the valve shown in Fig. 1.

Assuming that the valve is closed and the plug 13 seated, when it is desired to open the valve hand wheel 60 is turned in a direction to cause cross head nut 58 to travel up the screw spindle 56 (Fig. 2). This action swings the lever 37 upwardly thereby rotating the sleeve 32 in a counterclockwise direction within the stationary bushing 34. This effects movement of the sleeve 32 longitudinally of the axis of the shaft 23. However, since the sleeve 32 is prevented from moving longitudinally with respect to the shaft 23, as has been heretofore described, obviously any longitudinal movement imparted to sleeve 32 by lever 37, will cause a corresponding longitudinal or axial movement of the shaft 23, and since plug 13 is fixed to shaft 23, the plug will also be moved longitudinally or axially in the valve body 11, whereby the plug 13 is unwedged.

After the unwedging of the plug 13 effected by operation of the hand wheel 60 in the above described manner, the hand wheel 60 is released and hand wheel 63 is now operated.

Since the lever 43 is keyed to the valve shaft 23, obviously operation of the hand wheel 63 in a direction which causes the cross head nut 61 to move downwardly of the screw spindle 57 and thereby swing the lever 43 downwardly, causes a corresponding rotation of the plug 13 so that said plug is turned towards open position. Since the sleeve 32 is not keyed to the shaft 23 but is free to turn independently with respect thereto, there will not be any relative movement of sleeve 32 with respect to the stationary bushing 34 and consequently the valve plug 13 will remain in its unwedged position during the period the hand wheel 63 is being operated to turn the plug.

After the plug 13 has been turned to open position hand wheel 60 is again operated, but in a reverse manner, so as to move the lever 37 back towards the position shown in Fig. 2. This operation effects movement of the sleeve 32 longitudinally of the axis of the shaft 23 in a reverse direction from the direction initially imparted thereto, whereby the plug 13 is also moved longitudinally or axially in a straight line a distance equal substantially to the distance the plug was first moved, and hence the plug is rewedged or reseated in the valve body 11.

Due to the pivotal mounting of the screw spindles of the lever operating mechanism as has been heretofore described and the manner of connecting the outer ends of levers 37 and 43 with the cross head nuts 58 and 61, respectively, when the hand wheels 60 and 63 are operated the spindles 56 and 57 will swing outwardly from the shaft 23. This construction permits the employment of fewer parts in operatively connecting the hand wheels with the operating levers than would be possible were the screw spindles rigidly mounted in the valve.

It will be understood that modifications can be made in the construction of the valve without departing from the scope of the invention.

Having thus described our invention what we claim is:

1. In a device of the class described, a shaft, a lever operatively connected to said shaft for actuating the same, a screw spindle, a nut pivotally connected to the outer end portion of said lever and mounted on said spindle, means for supporting said spindle whereby the spindle is free to rotate in order to impart lengthwise movement of the nut thereon and is also free to swing inwardly and outwardly with respect to the shaft during travel of the nut thereon without moving lengthwise with respect to its support, and means for operating said spindle.

2. In a device of the class described, a shaft, a lever operatively connected to said shaft for actuating the same, a screw spindle, a non-rotatable nut carried by said lever and mounted on said spindle, means for rotating said spindle so as to impart movement of the nut lengthwise thereof, means for supporting said spindle whereby the spindle is free to swing inwardly and outwardly with respect to said shaft during travel of the nut thereon, and means for retaining said spindle from lengthwise movement with respect to its supporting means.

3. In a device of the class described, a shaft, a lever having one end operatively connected to said shaft, a screw spindle, a cross head nut mounted on said spindle for travel up and down the spindle, said nut being pivotally connected to said lever and held by the lever from rotating, means for turning the spindle, and means for rotatably and pivotally supporting said spindle whereby said spindle is prevented from moving lengthwise and is permitted to swing to and fro with respect to said shaft.

4. In a device of the class described, a shaft adapted to be moved rectilinearly and also adapted to be rotated, a lever operatively connected to said shaft and projecting laterally therefrom for imparting rectilinear movements to the shaft without rotating the same, a second lever operatively connected to said shaft and projecting laterally therefrom in an opposite direction to the first lever for rotating said shaft without imparting rectilinear movements to the same, and separate means for operating each of said levers independently of each other.

EUGENE C. BRISBANE.
ROBERT BISCHOFF.